T. H. TOMBYLL.
FLAX HARVESTING MACHINE.
APPLICATION FILED APR. 18, 1914.
1,207,665.
Patented Dec. 5, 1916.
2 SHEETS—SHEET 1.
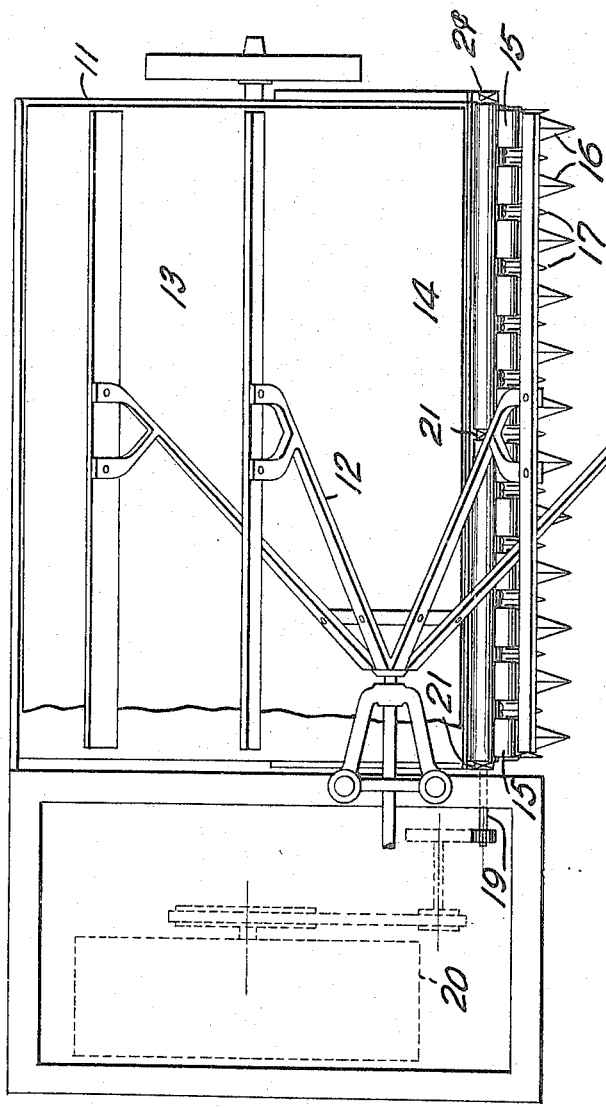
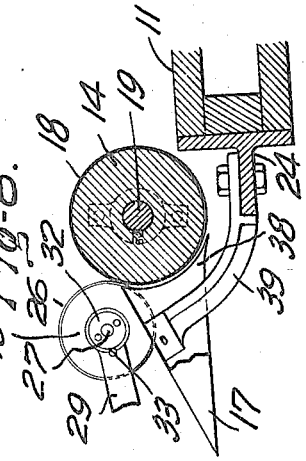
Thomas H. Tombyll,
Inventor.
His Attorney.

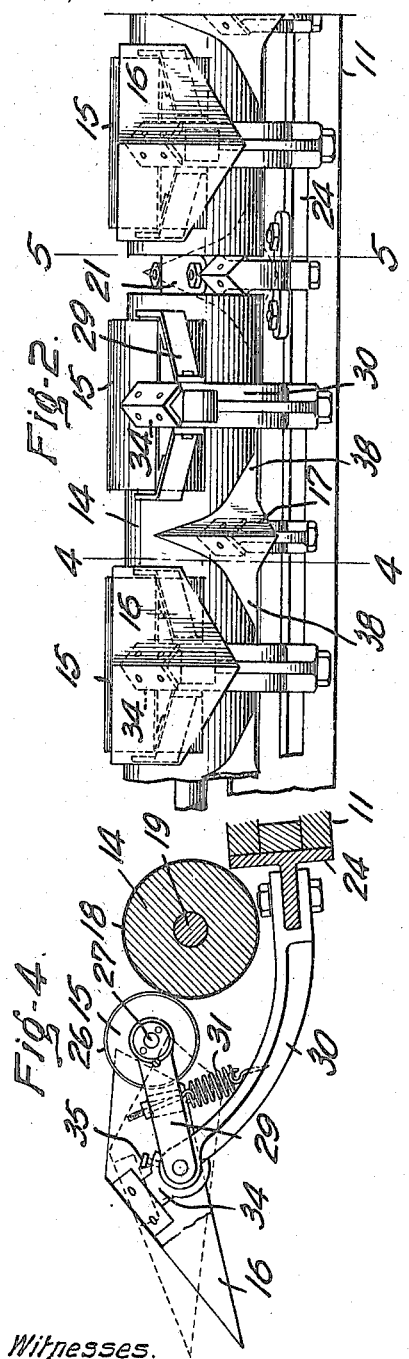
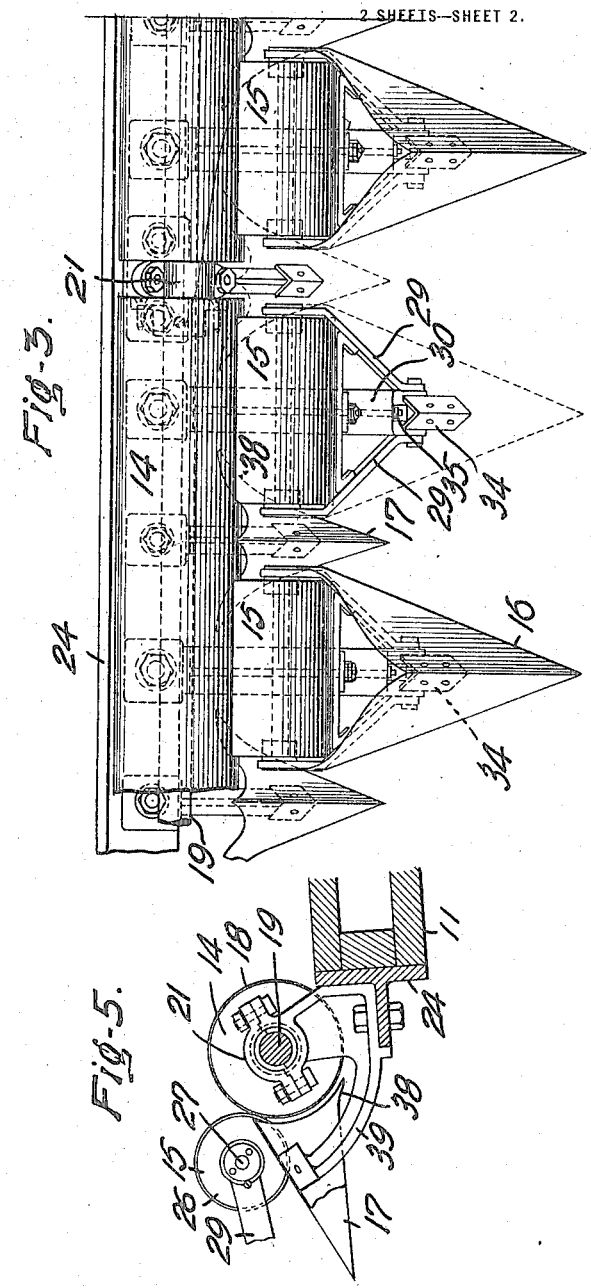

UNITED STATES PATENT OFFICE.

THOMAS H. TOMBYLL, OF MONTREAL, QUEBEC, CANADA.

FLAX-HARVESTING MACHINE.

1,207,665.  Specification of Letters Patent.  Patented Dec. 5, 1916.

Application filed April 18, 1914. Serial No. 832,989.

*To all whom it may concern:*

Be it known that I, THOMAS H. TOMBYLL, a subject of the King of Great Britain, and resident of the city of Montreal, in the Province of Quebec and Dominion of Canada, have invented new and useful Improvements in Flax-Harvesting Machines, of which the following is a full, clear, and exact description.

This invention relates to improvements in harvesting machines, and more particularly to that class of machine designed for harvesting flax or similar crops in which it is desired to preserve that portion of the stalk usually lost in the form of stubble.

The object of the invention is to provide simple and reliable means for gripping and pulling the stalks, whereby the plant will be uprooted and thrown back onto the table of an ordinary harvesting machine.

The device consists essentially of a roller in one or more sections arranged across the front of a harvesting machine table just above the position usually occupied by the sickle. Slightly above and in front of this roller are smaller rollers frictionally engaging and driven by the large roller. Brackets are provided extending in front of the rollers and carrying arrow shaped deflectors which work through the stalks and direct the same into the spaces between the small rollers. Further deflectors are provided below and between the small rollers, which receive the stalks from the primary deflectors, and direct the stalks thereof laterally between the small and large rollers, so that they are caught and uprooted and finally thrown back by the large roller on to the harvesting table.

In the drawings which illustrate the invention:—Figure 1 is a diagrammatic plan view of a harvester showing the location of the present invention thereon. Fig. 2 is a front elevation of a fragment of the pulling mechanism. Fig. 3 is a plan view corresponding to Fig. 2. Fig. 4 is a cross sectional view on the line 4—4, Fig. 2, showing the mounting of the small rollers and primary guides. Fig. 5 is a cross sectional view on the line 5—5, Fig. 2, showing the mounting of the larger roller and secondary guides. Fig. 6 is a view similar to Fig. 5, showing the mounting of the secondary guides alone. Fig. 7 is a fragmentary sectional view showing the bearing of one of the small rollers. Fig. 8 is a fragmentary sectional view showing the mounting of the large roller on its spindle.

Referring more particularly to the drawings, 11 designates the table of a harvesting machine, above which the reel 12 is mounted and arranged to carry the harvested crop back from the sickle on to the apron 13. In the present invention, the ordinary sickle is replaced by a special pulling attachment adapted to uproot the crop in place of cutting the stalks several inches above the ground. The device consists essentially of a main driving roller 14, driven rollers 15, and primary and secondary guides 16 and 17 arranged to direct the crop between the rollers. The main roller 14 is provided with a covering 18 of corrugated rubber or other suitable material, and is mounted on a spindle 19 driven by any suitable mechanism from the main running wheel 20 of the machine. This main roller may be in one section extending from side to side of the table, or in as many sections as necessary to provide rigidity between the bearings 21. The rollers 14 which are preferably of wood are each provided with a collar 22 set in flush with the end thereof and secured to the roller and to the spindle 19 by a set screw 23. The bearings 21 of the roll and the supporting brackets of the small rolls and guides are attached to the front edge member 24 of the harvester table, which is usually of T or L section. The small rolls 15 are comparatively short and spaced approximately half their length apart, as clearly shown. These rolls are each provided with a covering 26 arranged to coöperate with the covering of the large roll, so as to frictionally drive the small rolls. The rolls are mounted on a spindle 27 by means of ball bearings 28, so as to turn very easily. The spindles are in turn mounted at the ends of levers 29 pivotally connected at their opposite ends to brackets 30. These levers are drawn downwardly by springs 31 held in tension between themselves and the brackets, so as to press the rolls 15 tightly against the roller 14. In order that there may be no projecting edges or corners on which the crop could catch, round nuts 32 are used to connect the spindles to the levers 29, these nuts being adapted for a teat wrench and held against loosening by locking screws 33.

Pivotally mounted to the extremity of each bracket 30 is a short lever 34 provided with a locking screw 35. The extremity of this lever 34 is angularly formed for the attachment of the primary guides 16 which are most conveniently formed of sheet metal bent to L shape in cross section, and then cut to approximately arrow shape, as clearly shown in Figs. 3 and 4, the point of the arrow lying in the fold of the material. The width of these primary guides 16 is just sufficient to embrace the small rolls 15 and their supporting levers, as clearly shown in Figs. 2 and 3. Below and between the small rolls, secondary guides 17 are provided. These guides are also located considerably in the rear of the primary guides, and are provided with laterally extending rear corners 38 which project considerably beyond the ends of the small rolls and operate to direct the stalks at the ends of the small rolls in between these rolls and the large driving roll. These secondary guides 17 are mounted on brackets 39 projecting from the table edge member 24. These brackets 39 may where occasion demands be formed integral with the main roll bearings 21, as shown for instance in Fig. 5, but at other points these brackets will be formed separately, as shown in Fig. 6.

The operation of the device is extremely simple. As the machine is drawn through a field, the points of the primary guides penetrate the crop and direct the same into comparatively condensed rows. The secondary guides penetrate these condensed rows of stalks and divide the same, directing the stalks to right and left against the surface of the large roll 14. The laterally projecting wings 38 of the secondary guides carry the stalks so far in a lateral direction that they become caught between the ends of the small rolls 15 and the large roll. As soon as this occurs, the revolution of the rolls draws up and finally uproots the stalks, which then fall rearwardly on to the apron 13 under the influence of the reel 12, which prevents the stalks falling forwardly. The spring mounting of the levers carrying the small roll enables the same to yield according to the volume of stalks passing between the rolls, and yet maintain sufficient pressure to insure the uprooting, as will be readily understood. The rolls have been described as corrugated, and it will be understood that these corrugations may be of any size or direction desired, that is to say, either longitudinal, circumferential or helical, or the surface of the rolls may be plain.

Having thus described my invention, what I claim is:—

1. In a harvesting machine, the combination with a table of a main roll at the front edge parallel thereto, a plurality of short spaced rolls in yielding engagement with said first roll and parallel thereto, and means for directing stalks to be pulled into the spaces between the short rolls and between the short rolls and the long roll.

2. In a harvesting machine, the combination with a table, of a roll at the front edge thereof extending from side to side of the table, a plurality of short spaced rolls above and in advance of said long roll, means for directing stalks to be pulled into the space between said short rolls, and means for directing stalks from the space between the short rolls between the short and long rolls.

3. In a harvesting machine, the combination with a table of a roll at the front edge extending from side to side thereof, a plurality of short spaced rolls mounted in advance of said long roll, means for directing stalks to be pulled between the short and long rolls, and a resilient mounting for the short rolls holding the same toward the long roll, whereby stalks will be gripped between the short and long rolls and uprooted.

4. In a harvesting machine, the combination with a table of a roll at the front edge thereof extending from side to side, a plurality of short spaced rolls in advance of said long roll, brackets extending forwardly from the table under said short rolls, levers pivoted to the brackets and supporting said short rolls, springs holding the short and long rolls in frictional engagement, plow shaped stalk guides carried by said brackets in advance of the short rolls, smaller brackets projecting forwardly from the table between and below the short rolls, and further plow shaped guides carried by said brackets.

5. In a harvesting machine, the combination with a table of a long roll at the front edge thereof, a plurality of short rolls in advance of said long roll, brackets projecting forwardly from the table, supporting means for said short rolls mounted on the brackets, adjustable levers mounted on the brackets, plow shaped guides mounted on said adjustable levers in advance of the short rolls, said guides extending at their rear ends from side to side of the short rolls, further brackets projecting from the table between and below the short rolls, and secondary plow shaped guides mounted on said brackets having at the rear laterally extending wings adapted to direct grain stalks between the short and long rolls.

6. In a harvesting machine, a main roll at the front edge of the table and parallel thereto, driving means therefor, a second roll in yielding frictional engagement with the first, and means for directing stalks to be pulled around the ends of the second roll and into engagement between the two rolls.

7. In a harvesting machine, the combination with a table of a driven main roll at the front edge thereof and parallel thereto, a plurality of short spaced rolls in yielding frictional engagement with said first roll, means for directing stalks to be pulled between the ends of the short rolls and into engagement between the short and long rolls.

8. In a harvesting machine, the combination with a table of a roll at the front edge thereof and parallel thereto, a plurality of short spaced rolls in frictional engagement with the long roll, means for directing stalks to be pulled between the ends of the short rolls and the long roll, said means including a plow shaped member between the rolls of each pair having rearwardly and laterally extending arms projecting under the short rolls.

9. In a harvesting machine, the combination with a table of a driven roll at the front edge thereof and parallel thereto, a plurality of short spaced rolls in frictional engagement with the driven roll, adjustable means for directing stalks to be pulled into engagement between the short and long rolls, and spring tensioned mounting for said short rolls, whereby said short rolls will yield to the entrance of stalks between themselves and the long roll and maintain the stalks in frictional engagement with the long roll.

In witness whereof, I have hereunto set my hand, in the presence of two witnesses.

THOMAS H. TOMBYLL.

Witnesses:
S. R. W. ALLEN,
G. M. MORELAND.

Copies of this patent may be obtained for five cents each, by addressing the "Commissioner of Patents. Washington, D. C."